(12) United States Patent
Akopian et al.

(10) Patent No.: US 6,909,736 B2
(45) Date of Patent: Jun. 21, 2005

(54) SYSTEM FOR METHOD FOR FINE ACQUISITION OF A SPREAD SPECTRUM SIGNAL

(75) Inventors: David Akopian, Tampere (FI); Harri Valio, Lempäälä (FI); Seppo Turunen, Tampere (FI)

(73) Assignee: Nokia Corporation, Espoo (FI)

( * ) Notice: Subject to any disclaimer, the term of this patent is extended or adjusted under 35 U.S.C. 154(b) by 545 days.

(21) Appl. No.: 09/737,166

(22) Filed: Dec. 14, 2000

(65) Prior Publication Data

US 2002/0110184 A1 Aug. 15, 2002

(51) Int. Cl.[7] .......................... H04B 15/00; H04K 1/00; H04L 27/30
(52) U.S. Cl. ...................................................... 375/130
(58) Field of Search ............................... 375/130, 140, 375/142, 145, 137, 149, 147

(56) References Cited

U.S. PATENT DOCUMENTS

| | | | | |
|---|---|---|---|---|
| 4,481,646 A | * | 11/1984 | Godard ........................ | 375/321 |
| 5,111,479 A | * | 5/1992 | Akazawa ..................... | 375/130 |
| 5,271,034 A | * | 12/1993 | Abaunza ..................... | 375/150 |
| 5,313,491 A | | 5/1994 | Schramm et al. | |
| 5,577,066 A | * | 11/1996 | Schuchman et al. ........ | 375/222 |
| 5,638,362 A | * | 6/1997 | Dohi et al. .................. | 370/342 |
| 5,742,637 A | * | 4/1998 | Kanterakis et al. .......... | 375/147 |
| 5,805,017 A | * | 9/1998 | Razzell ........................ | 329/300 |
| 5,940,433 A | * | 8/1999 | Sawahashi et al. .......... | 375/149 |
| 6,154,487 A | * | 11/2000 | Murai et al. ................. | 375/150 |
| 6,208,291 B1 | * | 3/2001 | Krasner .................. | 342/357.12 |
| 6,232,922 B1 | * | 5/2001 | McIntosh .................... | 342/453 |
| 6,373,899 B1 | * | 4/2002 | Krasner ....................... | 375/259 |

FOREIGN PATENT DOCUMENTS

| | | |
|---|---|---|
| WO | WO 99/26370 | 5/1999 |
| WO | WO 00/59123 | 3/2000 |

* cited by examiner

*Primary Examiner*—Jean B. Corrielus
(74) *Attorney, Agent, or Firm*—Ware, Fressola, Van Der Sluys & Adolphson LLP

(57) ABSTRACT

A method, corresponding apparatus, and corresponding system for acquiring a received spread spectrum signal, the received signal having a carrier component at a carrier frequency, a code component having a code period, and a data component, the acquiring including matching the phase of a replica of the code component to the phase of the received code component and also determining any shift in the carrier frequency away from a transmitted carrier frequency, the method including the steps of: performing a first acquisition of the received signal so as to provide an approximately estimated carrier frequency and a phase of the replica and also so as to provide a code-wiped and an approximately carrier-wiped signal; and performing a second acquisition of the approximately carrier-wiped signal, the second acquisition including a substep of data wipe-off involving a squaring or similar operation on a signal derived from the approximately carrier-wiped signal; thereby providing a correction to the approximately estimated carrier frequency, a correction that accounts for the carrier frequency shift remaining after the first acquisition. The invention also comprehends a method including only a single acquisition, an acquisition including a data wipe-off involving a squaring or similar operation on a signal having a data component and a frequency component, i.e. the invention is of use in acquiring any kind of signal having a carrier component and a data component, regardless of whether a first, typically relatively coarse acquisition is performed.

52 Claims, 10 Drawing Sheets

SYSTEM FOR METHOD FOR FINE ACQUISITION OF A SPREAD SPECTRUM SIGNAL

FIELD OF THE INVENTION

This method relates, in general, to CDMA (Code Division Multiple Access) spread spectrum receivers, and more specifically, to fast acquisition of a spread spectrum signal, such as is performed by a fast acquisition GPS (Global Positioning System) receiver.

BACKGROUND OF THE INVENTION

Spread spectrum communication in its basic form is a method of taking a data signal that is used to modulate a sinusoidal carrier and then spreading its bandwidth to a much larger value, e.g. in a global positioning system (GPS) application by multiplying a single-frequency carrier by a high-rate binary (−1,1) pseudo-random noise (PRN) code sequence that is known to GPS users. Thus, the signal that is transmitted includes a data component, a PRN component, and a (sinusoidal) carrier component.

At the receiver, a synchronized replica of the transmitted PRN code is required to de-spread the data sequence. Initial synchronization, called acquisition, is followed by fine synchronization, which is called tracking.

The present invention relates to acquisition. Acquisition is the process by which the replica PRN code is synchronized (to within a small timing offset) with the code conveyed by the received signal either for the first time or after losing a previously acquired signal, and also by which the carrier frequency of the received signal is determined. Thus, to acquire a signal, an acquisition system must accurately determine any frequency-shifting of the received signal from the transmitted frequency in order to accurately wipeoff (remove) the carrier signal. Frequency-shifting can be caused by relative motion of the transmitter and receiver (Doppler-shifting) as well as by clock inaccuracies (so that a transmitter and receiver sometimes do not agree on what is in fact the same frequency). The carrier frequency-shifting results in a modulation of a code component after carrier wipe-off in the receiver. Thus, in acquiring a signal, it is also necessary that the replica code sequence be not only time-aligned with the received code sequence, but also modulated to compensate for the frequency-shifting so as to fully eliminate the PRN sequence and leave behind only the data conveyed by the received signal. The acquisition process is therefore a two-dimensional search, a search both in code phase and in frequency.

For low level signals additional frequency refining is sometimes necessary for closing tracking loops. Because of the two dimensional search needed for initial acquisition, a useful strategy is to first search with as coarse a frequency grid as possible in order to accelerate the search. As long as the replica code is aligned with the incoming signal in the code dimension one can refine the carrier frequency using only a one-dimensional but more fine resolution search in frequency.

A bottleneck here is the data modulation, i.e. the modulation of the signal by the data. In the initial acquisition stage, one strategy that is used is to take the frequency information from a coherent stage. The coherence length increase is limited due to 50 Hz navigation message and it reduces the gain of the system beyond 20 msec integration. Thus, for maximum gain, the resolution of coherent processing based methods is limited to 50 Hz. To go beyond this range one must either compensate for data modulation or sacrifice gain.

In weak signal conditions, a fine acquisition stage is required for tracking initialization. The frequency resolution of initial acquisition schemes is limited, due to the complexity of the two-dimensional search (i.e. for code phase and for any shift in the carrier frequency) and due to the data rate of 50 Hz (i.e. the navigation data rate for a GPS receiver). To obtain fine resolution, the data modulation must be wiped off, which according to the prior art has been accomplished either by bit detection, which is not always possible in weak signal conditions, or by a search over all possible data modulations of the signal as sampled in a set of samples, which imposes a significant computational burden. Another technique has been to use so-called zero-padding of a short segment of a signal so as to end up with a segment of a desired length, suitable for spectral analysis using a discrete Fourier transform (DFT) with a frequency spacing determined by the length of the zero-padded signal segment. Zero-padding with fine frequency spacing, without more however, does not yield fine frequency resolution in a noisy environment.

What is therefore needed, especially in weak signal conditions where sacrificing gain is sometimes not practical, is a computationally efficient way to more finely resolve the carrier frequency search than is possible without taking into account the data modulation.

SUMMARY OF THE INVENTION

Accordingly, the present invention provides a method, corresponding apparatus, and corresponding system for acquiring a received spread spectrum signal, the received signal having a carrier component at a carrier frequency, a code component having a code period, and a data component, the acquiring including matching the phase of a replica of the code component to the phase of the received code component and also determining any shift in the carrier frequency away from a transmitted carrier frequency, the method including the steps of: performing a first acquisition of the received signal so as to provide an approximately estimated carrier frequency and a phase of the replica and also so as to provide a code-wiped and an approximately carrier-wiped signal; and performing a second acquisition of the approximately carrier-wiped signal, the second acquisition including a substep of data wipe-off involving a squaring or similar operation on a signal derived from the approximately carrier-wiped signal; thereby providing a correction to the approximately estimated carrier frequency, a correction that accounts for the carrier frequency shift remaining after the first acquisition.

In a further aspect of the invention, the step of performing a second acquisition of the approximately carrier-wiped signal includes the substeps of: mixing the approximately carrier-wiped signal with a plurality of sinusoids in turn, each sinusoid at a different frequency in a range of frequencies serving as trial corrections to the approximately estimated carrier frequency determined in the step of performing a first acquisition, so as to provide a mixed signal; performing a first coherent processing of the mixed signal so as to provide a carrier-amplified signal; performing a data wipeoff using the carrier-amplified signal so as to provide a data-wiped signal, the data wipeoff including a squaring or similar operation on the carrier-amplified signal, thus retaining in the data-wiped signal, information about the carrier frequency shift remaining after the first acquisition; performing a second coherent processing of the data-wiped signal, the second coherent processing for providing a further correlated and filtered signal; and detecting the best value to use for the correction to the approximately estimated carrier frequency based on the further correlated and filtered signal for each different trial frequency correction.

In another, further aspect of the invention, the step of performing a second acquisition of the approximately carrier-wiped signal includes the substeps of: performing a first coherent processing of the approximately carrier-wiped signal so as to provide a carrier-amplified signal; performing a data wipeoff using the carrier-amplified signal so as to provide a data-wiped signal, the data wipeoff including a squaring or similar operation on the carrier-amplified signal, thus retaining in the data-wiped signal, information about the carrier frequency shift remaining after the first acquisition; and performing a mixing and second coherent processing, the mixing being performed on the data-wiped signal using a plurality of sinusoids in turn, each sinusoid at a different frequency in a range of frequencies serving as trial corrections to the approximately estimated carrier frequency determined in the step of performing a first acquisition, to provide a mixed and data-wiped signal, and the second coherent processing being performed on the mixed and data-wiped signal, the second coherent processing for providing a further correlated and filtered signal.

In yet another, further aspect of the invention, the step of performing a second acquisition of the approximately carrier-wiped signal includes the substeps of: performing a first coherent processing of the approximately carrier-wiped signal so as to provide a carrier-amplified signal; performing a data wipeoff using the carrier-amplified signal so as to provide a data-wiped signal, the data wipeoff including a squaring or similar operation on the carrier-amplified signal, thus retaining in the data-wiped signal, information about the carrier frequency shift remaining after the first acquisition; and performing a cross correlation of the data-wiped signal, the cross correlation including estimating the phase and then the correction to the approximately estimated carrier frequency.

In yet still even another, further aspect of the invention, the step of performing a second acquisition of the approximately carrier-wiped signal includes the substeps of: performing a common coherent processing of the approximately carrier-wiped signal so as to provide a first-processed; mixing the first-processed approximately carrier-wiped signal with a plurality of sinusoids in turn, each sinusoid at a different frequency in a range of frequencies serving as trial corrections to the approximately estimated carrier frequency determined in the step of performing a first acquisition, so as to provide a mixed signal; performing a first coherent channel processing of the mixed signal so as to provide a carrier-amplified signal; performing a data wipeoff using the carrier-amplified signal so as to provide a data-wiped signal, the data wipeoff including a squaring or similar operation on the carrier-amplified signal, thus retaining in the data-wiped signal, information about the; performing a second coherent channel processing on the data-wiped signal, the second coherent processing for providing a further correlated and filtered signal; and detecting the best value to use for the correction to the approximately estimated carrier frequency based on the further correlated and filtered signal for each different trial frequency correction.

The invention also comprehends a method including only a single acquisition, an acquisition including a data wipe-off involving a squaring or similar operation on a signal having a data component and a frequency component, i.e. the invention is of use in acquiring any kind of signal having a carrier component and a data component, regardless of whether a first, typically relatively coarse acquisition is performed.

Thus, according to the present invention, to achieve better than 50 Hz resolution, the data modulation of a CDMA signal is compensated for by complex squaring of the signal (or a similar operation). In the case of a binary phase shift keying (BPSK) data signal $d(t)=\pm 1$ with frequency shift modulation $\exp(jwt)$ (i.e. w is the shift in the frequency of the carrier), complex squaring doubles the frequency and removes the data modulation, essentially according to, $$s^2(t)=d(t)e^{jwt}d(t)e^{jwt}=e^{2jwt}.$$

Therefore, the frequency of the resulting signal is twice the angular frequency w sought to be determined. So by taking the square of the data modulated signal (not the square of the magnitude of the data modulated signal, but rather the ordinary algebraic square), the data modulation can be wiped off. However, such an operation is sometimes not, by itself, enough for robust acquisition to better than 20 dB-Hz (signal-to-noise (S/N) ratio multiplied by the frequency band at the point where the S/N is taken), although it usually is enough in case of a strong signal. In general, though, the squaring technique must be combined with properly incorporated coherent accumulation (i.e. accumulation of terms taking into account both their magnitude and sign or phase) and filtering stages to achieve fine resolution better than 1 Hz with only a moderate computational burden.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1A:
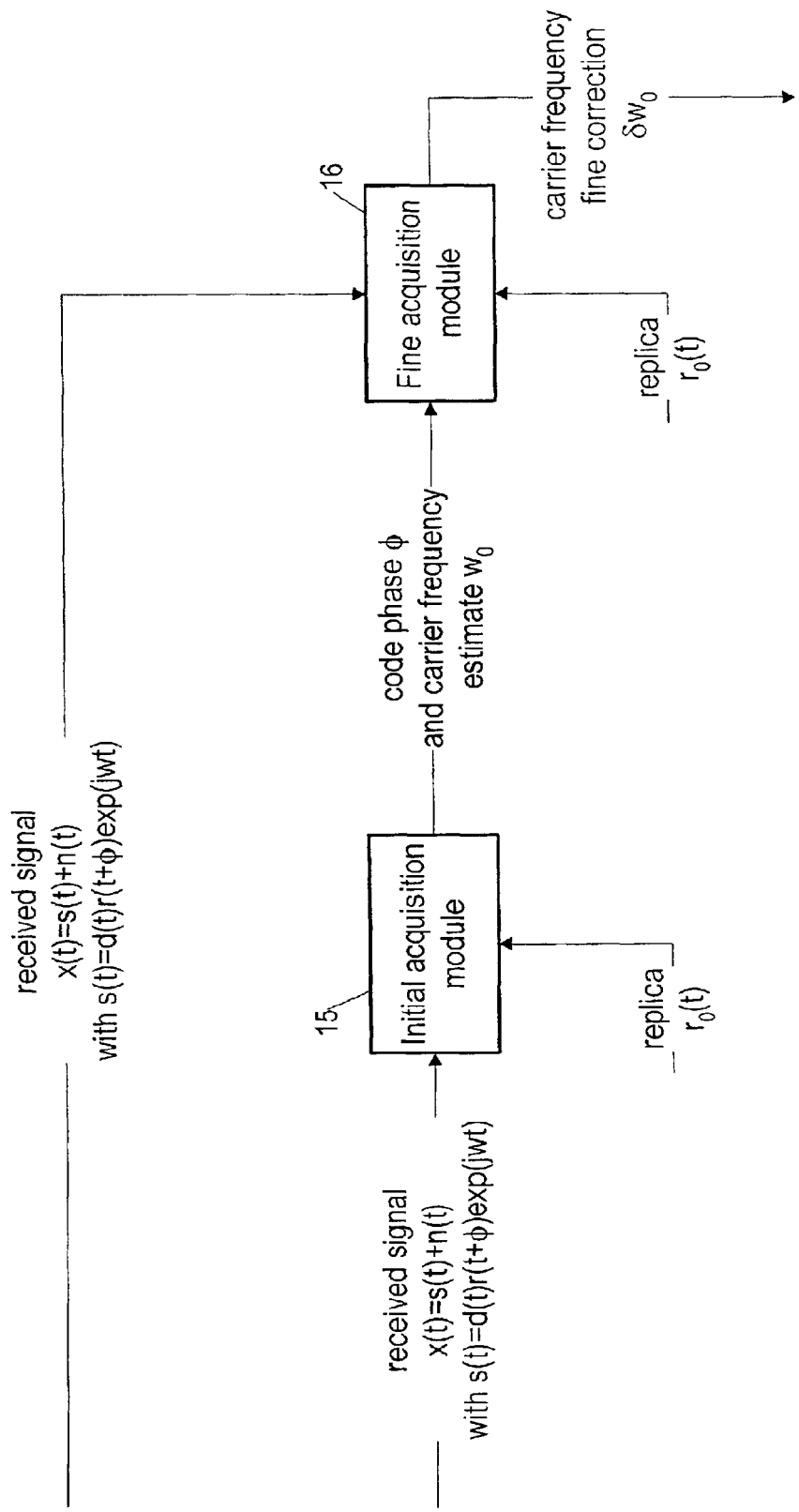
FIG. 1A is a schematic/block diagram of a portion of a receiver in which, according to the present invention, the an initial acquisition module is followed by a fine acquisition module for providing a fine frequency shift correction to refine the carrier frequency determined by the initial acquisition module.

The present invention will now be described in connection with a receiver for receiving a direct sequence (DS) spread spectrum signal transmitted by a satellite vehicle. A global positioning system (GPS) signal transmitted by a satellite vehicle is an example of a DS spread spectrum signal. It should be understood however, that the present invention, a system for acquiring a spread spectrum signal, is not limited to acquiring a spread spectrum signal in any particular context, such as GPS, nor is it limited to acquiring a particular kind of spread spectrum signal. As will be clear from what follows, a system according to the present invention for acquiring a spread spectrum signal can be of use in any application in which a spread spectrum signal is to be acquired, as long as the spread spectrum signal includes a code component and a carrier component.

Notation and Context

In what follows, it is assumed that the carrier is wiped-off the received signal, and we are processing the digitized signal after analog to digital conversion. The initially periodic signal is corrupted by noise and shifted in frequency due to the Doppler effect and other causes (including differences in the rates of the transmitter and receiver clocks), and is modeled as $$x(n)=s(n)+x_{noise}(n)$$

where the received signal at the receiver is $$s(n) = s_0(n - n_c)e^{j\left(2\pi \frac{f_D}{f_s}n+\varphi\right)} = s_0(n-n_c)e^{j(w'_D n+\varphi)}$$

in which $$s_0(n)=A \cdot d\{\text{floor}(n/N_{dp})\}r(n \bmod N_{cp}).$$

Here, $s(n)$ is the received signal at the receiver, $x_{noise}(n)$ is the noise component of the received signal, $A$ is a scaling factor, $s_0(n)$ is the signal with zero code phase and Doppler frequency or other frequency shift offsets, $n_c$ is the unknown code phase of the received signal (with respect to the replica code) measured in for example samples, $N_{dp}$ is the duration of a data bit (in samples), $N_{cp}$ is the code period (in samples) $f_D$ is the unknown frequency shift appearing because of relative motion of the receiver and the transmitter and because of other causes, $w'_D$ is the corresponding angular frequency normalized to the sampling frequency, $d(n) \in \{-1,1\}$ is the sample value obtained in sampling a data bit, and $r(n) \in \{-1,1\}$ is a sample of the replica code. The variable w is used to represent the ordinary angular frequency, related to the ordinary frequency f by the equation $w=2\pi f$. The disclosure also uses the variable w', as above, to represent the digital signal processing analog of the ordinary angular frequency. The variable w' is a normalized angular frequency and is dimensionless; here it is normalized to the sampling frequency, and so is given by $w'=2\pi f/f_s$ where $f_s$ is the sampling frequency. Thus, a sinusoid sampled at time t, the sample being the $n^{th}$ sample in a series of samples, can be expressed as either $\exp(jwt)$ or $\exp(jw'n)$.

The data bit duration is usually several code periods (usually 20 code periods in the case of a GPS signal). Without loss of generality, the common scaling factor $Ae^{j\Phi}$ is also ignored since it does not affect the system design. Thus we assume here a normalized received signal, given by, $$x(n)=r\{(n-n_c) \bmod N_{cp}\}e^{jw'(n-n_c)}+x_{noise}(n).$$

Terminology

Coherent processing: a process in which consecutive signal data points are summed after possibly being multiplied by factors that may depend on frequency; implemented as e.g. by an integrate and dump module followed by a filter, or by a lowpass filter followed by a downsampler.

Filter (for filtering a signal): typically a finite impulse response (FIR) filter, i.e. a convolution of a signal with some predetermined short signal (the filter coefficients), which can be implemented as, $$y(n) = \sum_{k=0}^{M} h(k)x(n-k),$$

where $x(\dots)$ is the signal being filtered, $h(\dots)$ is a filter coefficient, and $y(\dots)$ is the filtered signal; but could also be an infinite impulse response (IIR) filter (implemented e.g. using constant coefficient difference equations).

Noncoherent Processing: a process in which the magnitudes or squares of the magnitudes of consecutive data values are summed.

The Invention in General

Referring now to FIG. 1A, in a spread spectrum receiver according to the invention, an initial acquisition stage 15 analyzes a received spread spectrum signal x(t) and then provides a coarse estimate $w_0$ of the carrier frequency and a value for the phase to be used for the replica code to wipe off (remove) the code component of the received spread spectrum signal. The value for the coarse estimate of the carrier frequency and the value for the code phase are provided to a fine acquisition module 16, which is also provided with the received spread spectrum signal x(t). The fine acquisition module then determines a correction $\delta w_0$ to the coarse estimate $w_0$ of the carrier frequency.

Figure 1B:
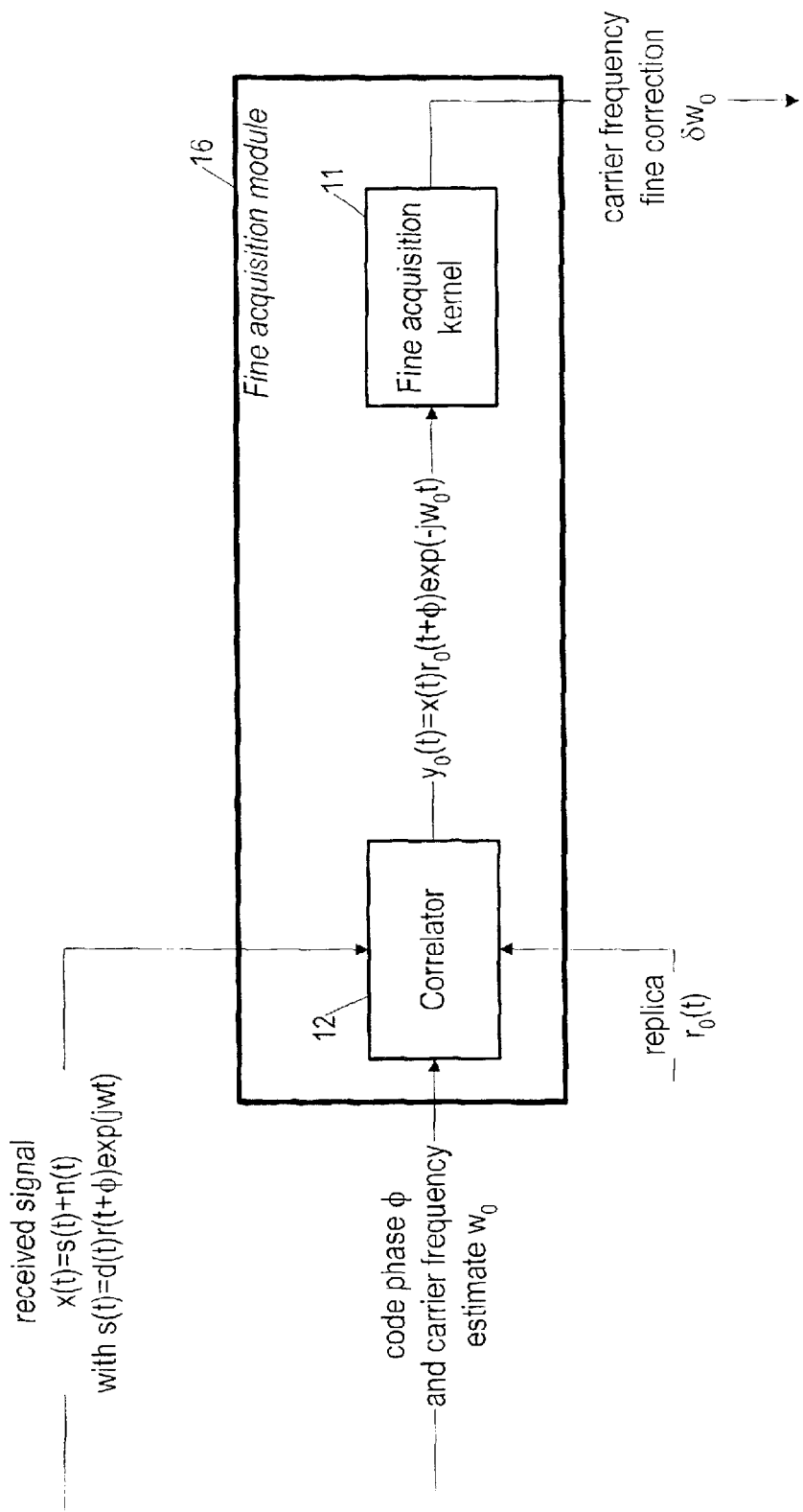
FIG. 1B is a schematic/block diagram of a the fine acquisition module of FIG. 1A, showing that it includes a correlator followed by a fine acquisition kernel.

Referring now to FIG. 1B, the fine acquisition module 16 is shown as including a correlator 12 and a fine acquisition kernel 11. The correlator 12 is typically a conventional correlator, of the type that would be used in a tracking module. Therefore, in a GPS application, the correlator would perform correlations of the received spread spectrum signal x(t) over one code period (1023 chips). Using the coarse estimate $w_0$ of the carrier frequency and a value for the phase to be used for the replica code, the correlator wipes off the code component of the received signal x(t) and also performs a partial demodulation of the received signal x(t), based on the coarse estimate $w_0$ of the carrier frequency, so as to partially remove the carrier. The output of the correlator 12 is therefore the navigation data corrupted by noise and modulated by the remaining frequency shift. In a typical GPS application, the bandwidth of the resulting signal is 1 kHz, (i.e. the correlator output will be attenuated for a remnant frequency modulation more than 500 Hz from the estimate of the carrier frequency determined in the initial acquisition stage).

The method presented here analyzes the output of the correlator 12 at each frequency in a predetermined set of frequencies to be tried as guesses at the remaining frequency shift. The method further demodulates the signal x(t) using each guess (trial value) at the carrier frequency, enhances the signal processed according to the guess, and uses the enhanced signal in a detection unit that decides whether the guess is approximately correct.

1st Embodiment

Figure 2A:
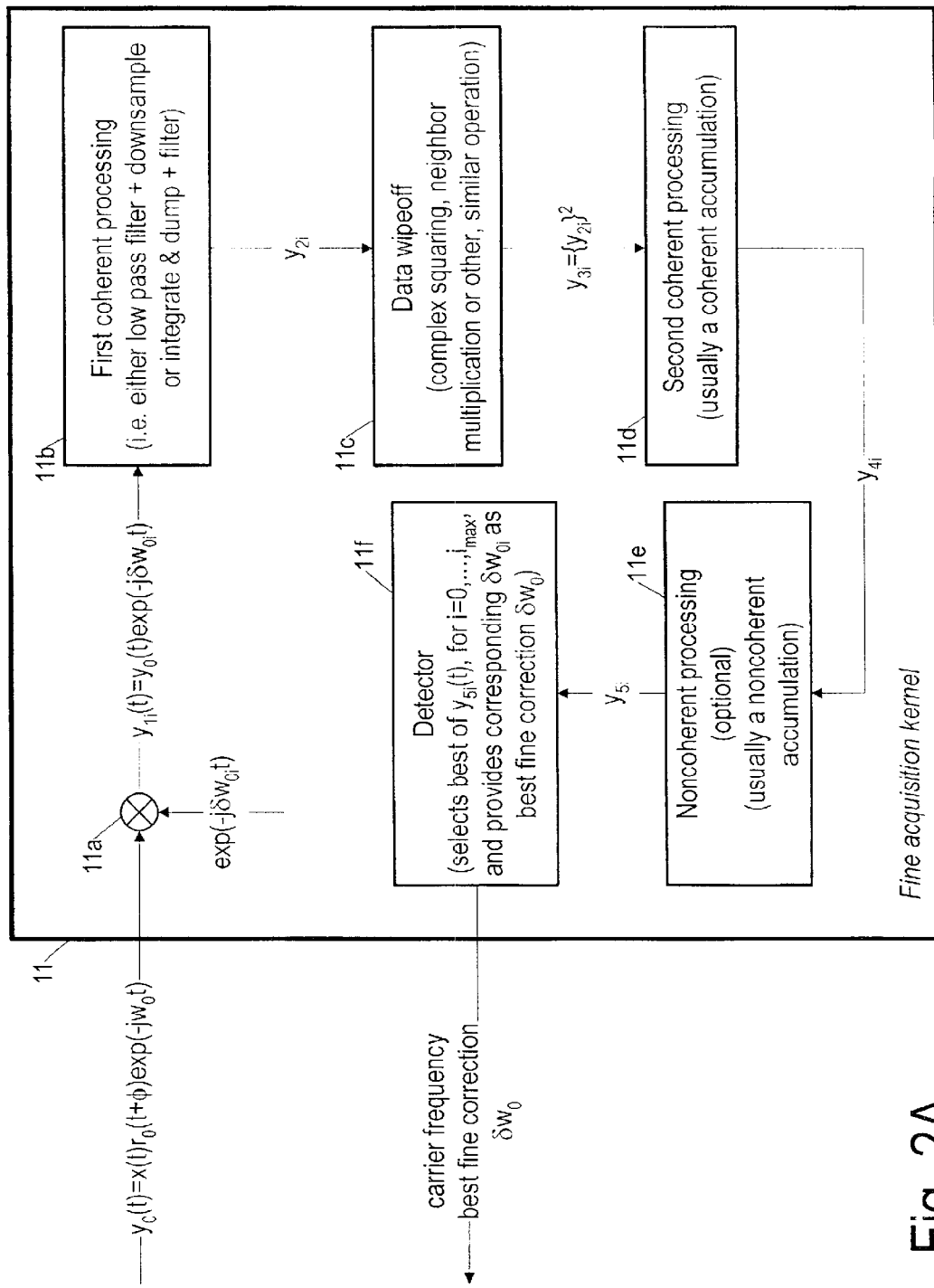
FIG. 2A is a schematic/block diagram of a first embodiment of a fine acquisition kernel according to the invention, an embodiment in which the output of the correlator is immediately demodulated based on a guess of the fine frequency shift correction, followed by a first coherent processing module.

Referring now in particular to FIG. 2A, in a first embodiment, the fine acquisition kernel 11 is shown receiving as an input the approximately demodulated and code wiped received signal $y_0(t)$, which is immediately mixed by a mixer 11a with a set of sinusoids, each based on a different trial value $\delta w_{0i}$ for a fine correction $\delta w_0$, providing the mixed samples, $$y_{1i}(t)=y_0(t)\exp(-j\delta w_{0i}t). \quad (1)$$

The mixed signals $y_{1i}(t)$ (there being one for each different trial correction $\delta w_{0i}$) are provided to a first coherent processing module 11b, which is implemented as either a low pass filter followed by a downsampler, or by an integrate and dump module followed by a filter. The first coherent processing module 11b includes a (coherent) summation over a number L of mixed samples, and so produces one output for every L samples. The summation can be expressed as, $$y_{2i,int}(n) = \sum_{k=0}^{L-1} y_{1i}(L \cdot n + k) \quad (2)$$

where L is the coherent integration length, i.e. the number of samples (mixed by mixer 11a) included in the integration (summation), and n indicates the $n^{th}$ output, and so plays the role of time, but according to a different time scale than the corresponding index L·n+k used to indicate the different inputs (mixed samples) $y_{1i}(L \cdot n+k)$; the index n is incremented only once for every L increments of the index L·n+k.

The first coherent processing module 11b then filters the summation result $y_{2i,int}(n)$. The filtering is performed to increase the coherence length (the number of samples over which the effect of the data modulation is negligible) without downsampling and so keep the signal oversampled (relative to the sampling that would be required for the received signal) in anticipation of the code wipeoff, which, as explained below, has the effect of doubling the remnant carrier frequency. (In other words, the filter further reduces the signal bandwidth, keeping the signal oversampled.) Although the invention does not depend an any particular implementation of a filter, and indeed the filtering here can be either a finite impulse response (FIR) or infinite impulse response (IIR) filtering, for purposes of illustration, the invention is here described as using FIR filtering. With such a filter, the first coherent processing module 1ib provides the final output, $$y_{2i}(n) = \sum_{m=0}^{M-1} h_2(m) y_{2i,int}(n-m) = \sum_{m=0}^{M-1} h_2(m) \sum_{l=0}^{L-1} y_{1i}(L \cdot (n-m)+l), \quad (3)$$

where $h_2(\ldots)$ are the filter coefficients.

The output of the first coherent processing module 11b is provided to a data wipeoff module 11c, which, in the preferred embodiment, performs essentially a complex squaring (as opposed to forming the product of a quantity with its complex conjugate), so that in such an implementation, the output of the data wipeoff module can be represented as, $$y_{3i}=y_{2i}y_{2i}=\{y_{2i}\}^2. \quad (4)$$

The output $y_{3i}$ of the data wipeoff module 11c is provided to a second coherent processing module 11d, which, in the preferred embodiment, operates on $y_{3i}$ in the same way as the first coherent processing module operates on its input $y_{1i}$, thus providing as its output, $$y_{4i}(n) = \sum_{m=0}^{M-1} h_4(m) \sum_{l=0}^{L_4-1} y_{3i}(L_4 \cdot (n-m)+l) \quad (5)$$

where $h_4(\ldots)$ are the filter coefficients, and where $L_4$ is the coherent integration length. In some embodiments, however, the second coherent processing is simply a coherent accumulation.

The output $y_{4i}$ of the second coherent processing module 11d is, optionally, provided to a noncoherent processing module 11e, which has the effect of further elevating over any noise the sought after signal indicating the best correction $\delta w_{0i}$ to the coarse estimate of the carrier frequency provided by the correlator 12. A noncoherent processing is, in the preferred embodiment, implemented as any simply noncoherent accumulation/summation, i.e. an accumulation (summation) that ignores the sign or phase of the terms being summed. Thus, possible expressions for the output of the noncoherent processing module 11e include, $$y_{5i}(n) = \sum_{l=0}^{L_{nc}-1} |y_{4i}(L_{nc} \cdot n + l)| \quad (6)$$

and $$y_{5i}(n) = \sum_{l=0}^{L_{nc}-1} |y_{4i}(L_{nc} \cdot n + l)|^2, \quad (6')$$

where $L_{nc}$ is the coherent integration length, and where |x| represents the operation of taking the magnitude of the quantity x, i.e. e.g. simply its absolute value if x is purely real, but the square root of the product of x and its complex conjugate if x is complex.

The output of the noncoherent processing module 11e, if included in an implementation of the invention, or of the second coherent processing module 11d if noncoherent processing is not performed in the implementation, is provided to a detector 11f. Whether because an implementation of the invention includes parallel processing for each channel i (corresponding to a particular trial value for a correction to the carrier frequency) or because the implementation processes the signal for each channel i in turn, the detector module 11f ultimately receives an input corresponding to each channel. It then compares all of these channel inputs, each of which is the result of processing the signal $y_0(t)$ mixed with the trial value for the channel in such a way as to produce an input to the detector that is larger the closer the trial value is to the true correction to the carrier frequency estimated by the correlator 12. In a simple implementation of the detector module 11f, in an implementation including the noncoherent processing module 11e, if the total number of channels is $N_{ch}$ so that the total number of trial values on each side of a null correction is $N_f = (N_{ch}-1)/2$, and $\Delta f$ is the frequency interval separating adjacent trial values, the output of the detector module 11f is the best estimate of the correction to the carrier frequency expressed as a (non-normalized) angular frequency increment $\delta w_0$ given by, $$\delta w_0 = 2\pi \delta f_0 = 2\pi \{\arg \max(y_{50}, y_{51}, \ldots, y_{5N_{ch}-1}) - N_f\} \cdot \Delta f, \quad (7)$$

in which $\arg \max(y_{50}, y_{51}, \ldots, y_{5N_{ch}-1})$ provides the channel number for which the result of the processed signal is the largest, and in which $\delta f_0$ is the corresponding best correction to the carrier frequency $f_0$ (i.e. cycles per second).

Figure 2B:
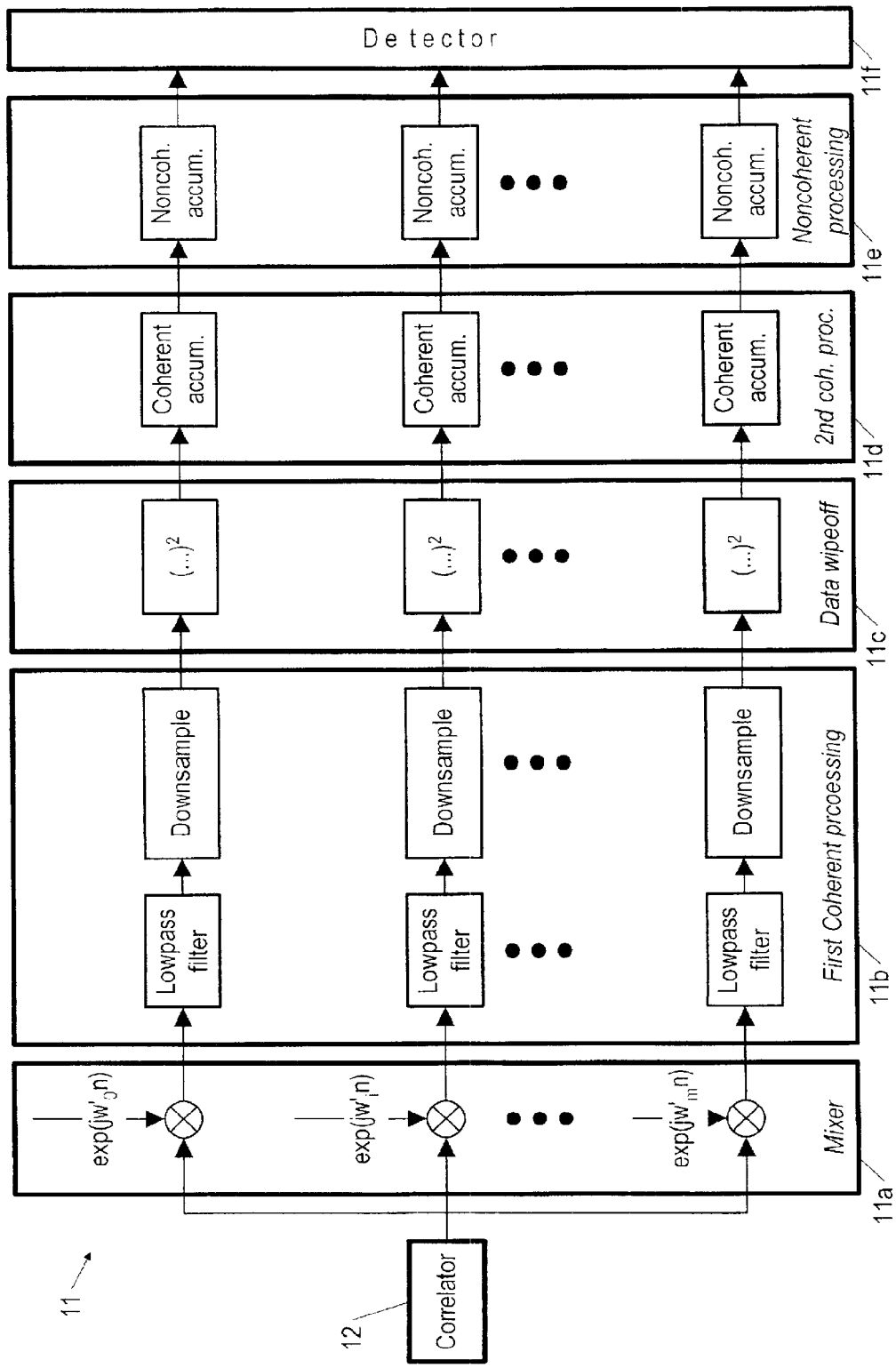
FIG. 2B is a schematic/block diagram of the same first embodiment of a fine acquisition kernel as illustrated in FIG. 2A, but specifically for an implementation in which processing is performed in parallel for each channel, i.e. for each trial (guess) fine frequency shift correction, and including a low pass filter and downsampler as an implementation of the first coherent processing module.

Referring now in particular to FIG. 2B, an implementation of the first embodiment of the present invention is shown in which parallel processing paths are used for different estimates of the fine frequency correction, the embodiment otherwise being the same as that illustrated in FIG. 2A. The number of different parallel processing paths, or grid steps, is determined by the required frequency resolution of the acquisition system and the resolution provided by the correlator 12 (FIG. 1). In the implementation illustrated in FIG. 2B, the first coherent processing module 11b of FIG. 2A is implemented as a lowpass filter module followed by a downsample module. Thus, after the demodulation (by the mixer 11a in a series implementation or the corresponding set of mixers 11a in a parallel implementation) in each channel, i.e. for each frequency shift guess correction $w_{0i}$, the bandwidth is reduced by means of the lowpass filter module and then downsampled by the downsample module to remove redundant data from each channel.

Figure 2C:
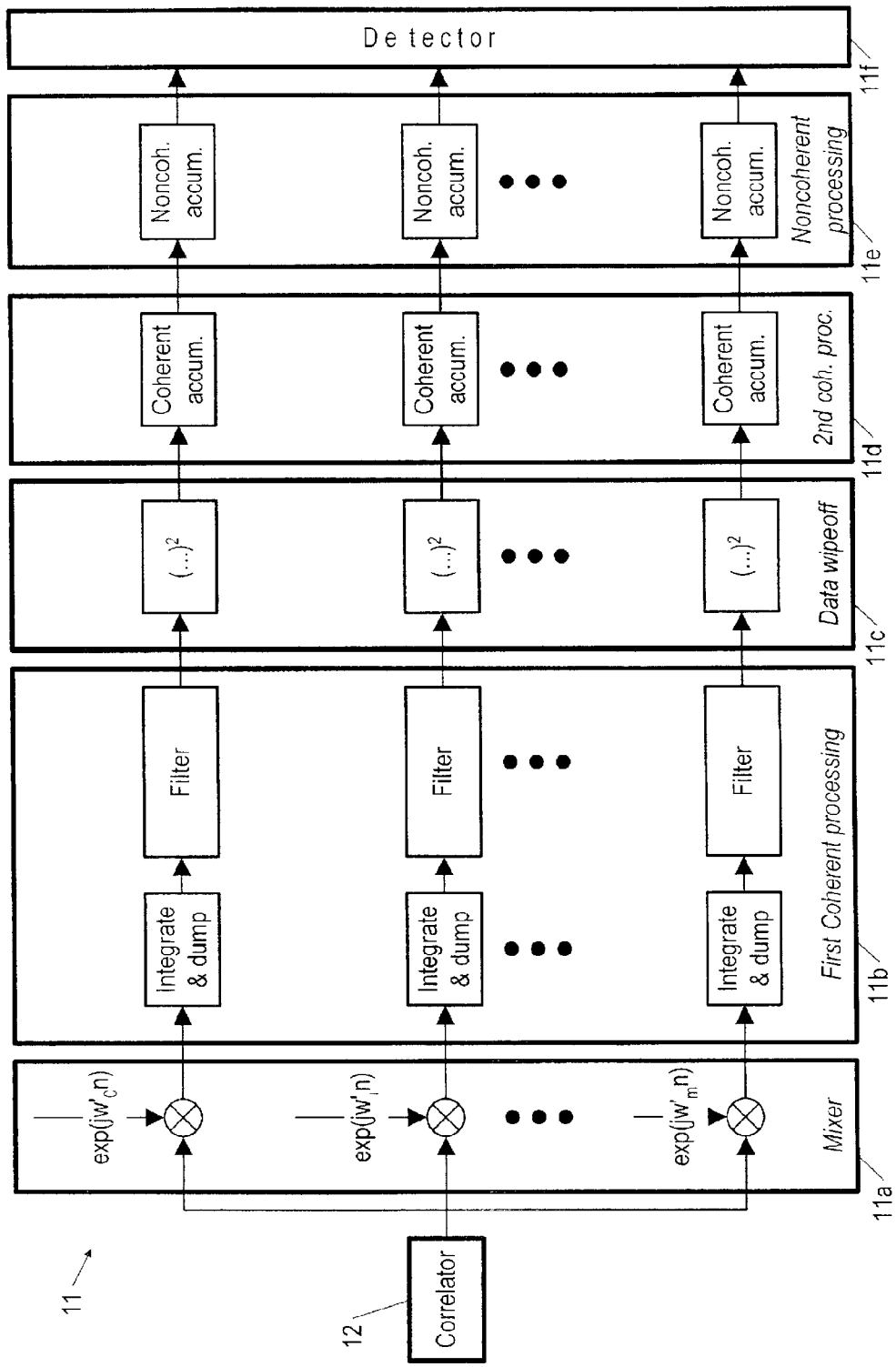
FIG. 2C is a schematic/block diagram of the same first embodiment of a fine acquisition kernel as illustrated in FIG. 2A, and specifically for an implementation in which processing is performed in parallel for each channel, as in FIG. 2B, but instead of using a low pass filter and downsampler as an implementation of the first coherent processing module, an integrate and dump module is used, followed by a filter.

Referring now to FIG. 2C, in another implementation of the first coherent processing module 11b, an integrate and dump module can be used, followed by a filter.

Figure 2D:
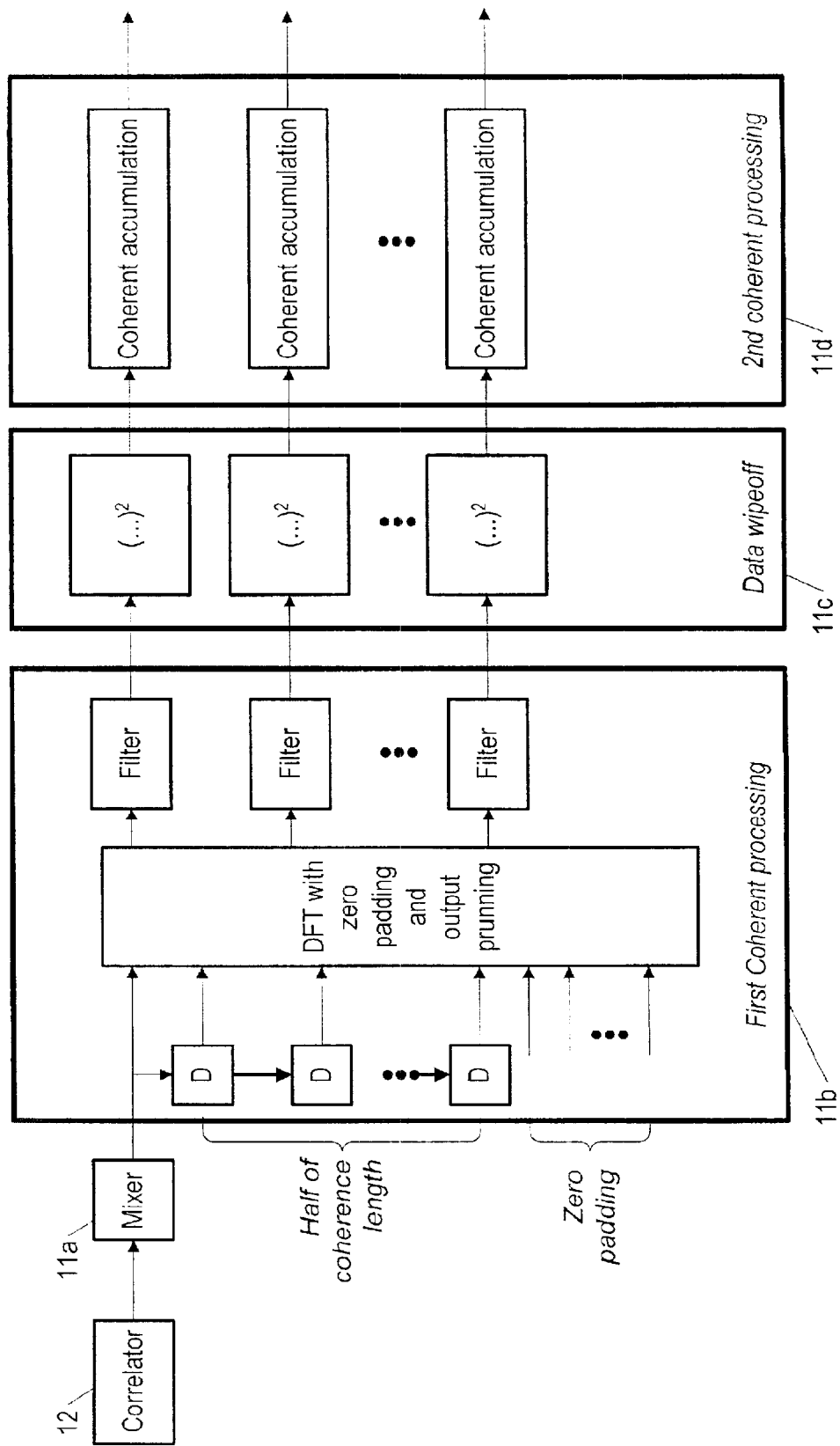
FIG. 2D is another implementation of the first embodiment of a fine acquisition kernel, the embodiment indicated generally in FIG. 2A, an implementation in which zero padding is used.

A variation on the theme illustrated by FIGS. 2B–2C is presented in FIG. 2D, where a DFT module is used to demodulate the signal with zero-padding on the input to the DFT module and with output pruning (i.e. taking a subset of the output values for further processing). A DFT matrix is the collection of sinusoidal signals of a certain length (DFT size), each signal appearing as the row of the DFT matrix. In performing a DFT analysis of a signal, the signal is represented as a vector, the components of which are sample values of the signal. The result of the DFT analysis is the matrix multiplication of the signal vector. Such a multiplication involves both an elementwise multiplication producing a set of products, and then a summing of the products. These operations are similar to the multiplying by a sinusoid and the coherent processing of the invention, and so in some embodiments of the invention, DFT is used to implement the multiplying by sinusoids and the coherent processing operations.

Complex Squaring or Other Similar Operations for Performing Navigation Data Wipeoff Because of navigation data modulation of the received signal, for a GPS signal the bandwidth of the correlator 12 (FIG. 1) cannot be reduced to achieve resolution finer than 50 Hz (corresponding to a period of 20 msec), and the integration length (for coherent integration) is therefore limited to 20 msec duration. The correlator output is, for typical GPS applications, at a rate of 1 msec, and the coherent integration length is therefore limited to 20 samples (correlator outputs). Such a coherent integration length provides 50 Hz resolution. As explained above, to obtain finer resolution, the signal samples are complex squared so as to wipe off the navigation data, as indicated by the data wipe off module 11c (FIGS. 2A–2C). But there are also similar operations that can be used, such as neighbor multiplication.

The terminology complex squaring is intended to convey that each sample is multiplied by itself (not by its complex conjugate) i.e. given a sampled signal $x_1, x_2, \ldots, x_i, x_{i+1}, \ldots, x_N$, complex squaring provides the signal $x_1 x_1, x_2 x_2, \ldots, x_i x_i, x_{i+1} x_{i+1}, \ldots, x_N x_N$. The terminology neighbor multiplied is intended to indicate multiplying each sample in a sampled signal by a neighbor. More specifically, given a sampled signal $x_1, x_2, \ldots, x_i, x_{i+1}, \ldots, x_N$, neighbor multiplication provides $x_1 x_2, x_2 x_3, \ldots, x_i x_{i+1}, x_{i+1} x_{i+2}, \ldots, x_{N-1} x_N)$. Note that a GPS signal in a receiver is typically implemented as a complex number by providing by an in-phase and quadrature-phase component, and treating one component as real and the other as imaginary.

Basis for the Invention

The squaring doubles the modulation frequency causing aliasing effects. Thus the signal before the squaring device should be oversampled (by a factor of two) to prevent the frequency estimation ambiguity that could result because of aliasing. As already indicated, in a simple implementation such as that illustrated in FIG. 2C, the oversampling can be provided by an integrate and dump procedure followed by the trivial filter (i.e. the filter with coefficients [1 1] or in other words the filter of size 2 which has coefficients 1.0) or other type of filter.

If the output of the correlator 12 is $$y_0(n) = A(w)d(n)e^{jwt}$$

with $d(n) = \pm 1$ denoting the data bit modulation, then after a coherent integration of length M, the signal will be $$y_0'(t) = \alpha M A(w) d(t) e^{jwt} = A'(w) d(t) e^{jwt}.$$

where $\alpha$ is the degradation factor caused by the data modulation. Complex squaring wipes off the data bit, yielding, $$y_0''(t) = A'^2(w) d(t) e^{jwt} d(t) e^{jwt} = A'^2(w) e^{2jwt}$$

and so also doubles the frequency of the remaining sinusoidal modulation. If coherent integration is applied after squaring, then due to the modulation, the value resulting from the complex squaring will vanish if the frequency guess is wrong ($w \neq 0$) but will not vanish if the frequency guess is correct ($w = 0$), and may be considered to be amplified. As mentioned above, a noncoherent accumulation can also be used to enhance the effect, i.e. to further distinguish the value corresponding to the correct guess from the values corresponding to incorrect guesses. Thus, again referring to FIGS. 2A–C, the invention includes the following steps for each channel:

A mixing, performed by a mixer 11a, of the output of the correlator 11 with a sinusoid at the fine frequency shift correction corresponding to the channel;

A first coherent processing performed by a first coherent processing module 11b, i.e. lowpass filtering followed by downsampling (which can be implemented as an integrate and dump module followed by a filter);

A data wipeoff performed by a data wipeoff module 11c, i.e. complex squaring, neighbor multiplication or other procedure wiping off the data modulation;

A second coherent processing performed by a second coherent processing module 11d; and Noncoherent processing (optional) performed by a noncoherent processing module 11e, i.e. a combining of the magnitude of the results of the above steps over several periods of the carrier frequency.

These channel steps (i.e. steps for each frequency shift guess correction $w_{0i}$) are followed by a detection step performed by a detector module 11f in which the most likely correct estimate of the frequency shift is made by examining the results obtained for each channel via the channel steps.

The first coherent processing module 11b (FIG. 2A) helps to increase the carrier to noise (C/N) ratio in a way similar to what is done by the correlator 12. Even in the presence of data modulation, the first coherent processing module lib enhances the signal. The low-pass filtering of the first coherent processing module 11b increases the coherence length (i.e. number of samples per data bit) without downsampling and keeps the signal oversampled.

The next step, performed by the data wipeoff module 11c, (i.e. the step of e.g. complex squaring) doubles the frequency of the signal by a factor of two with some loss in gain. Performing the step of data wipeoff by complex squaring of the signal input to the step preserves the phase information about the carrier frequency shift conveyed by the signal input to the step.

The data wipeoff step is followed by a second coherent step, performed by the second coherent processing module 11d, to narrow the bandwidth (frequency of the signal) down to a resolution of 1 Hz resolution (in case of a GPS signal).

What is being done here, in performing a first coherent processing (including a filtering), squaring, and then a second coherent processing, is to first increase the signal to noise ratio of the correlator output mixed with a sinusoid at a trial frequency correction (since the signal strength increases in direct proportion to the integration length of the coherent integration, whereas the noise increases only as the square root of the integration length), next to wipeoff from the signal the navigation data by squaring or other similar operation (which increases both the signal and the noise by the same factor), and then to further increase the resulting signal over the noise using a second coherent processing. Each of the coherent processing operations can be viewed as performing a correlation of a sinusoid (at the trial frequency) with the output of the correlator 12 from the initial acquisition stage. Thus, the further correction to the carrier frequency provided by the invention is the frequency of the sinusoid having the largest correlation with the output of the correlator, and it is only by removing the navigation data modulation of the output of the correlator 12 that it is possible to distinguish between correlations of the output of the correlator 12 with sinusoids at frequencies separated by less than the frequency of the navigation data modulation.

2nd Embodiment

Figure 3A:
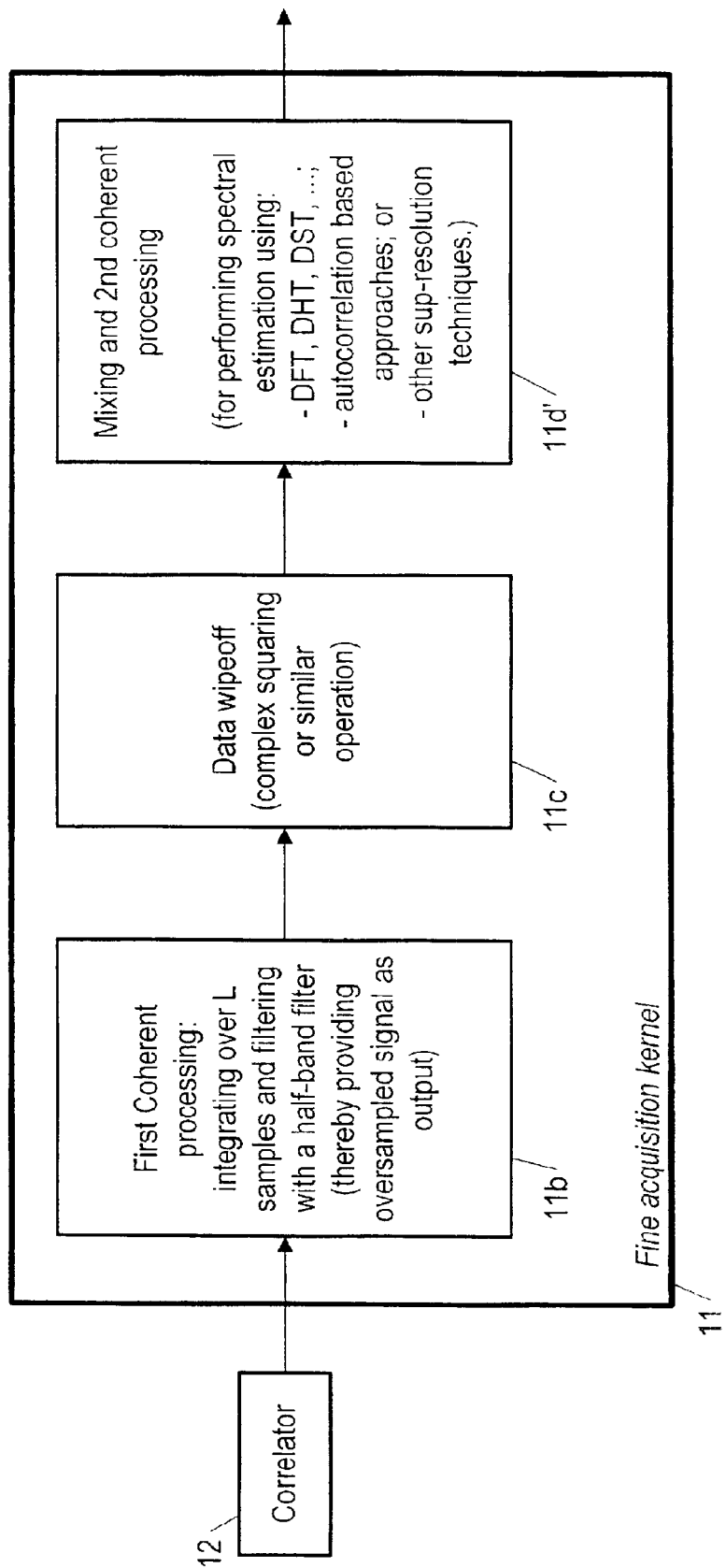
FIG. 3A is a schematic/block diagram of a second embodiment of a fine acquisition kernel according to the present invention, one in which the output of the correlator is not demodulated (based on a guess of the fine frequency shift correction) until after the first coherent processing.
Figure 3B:
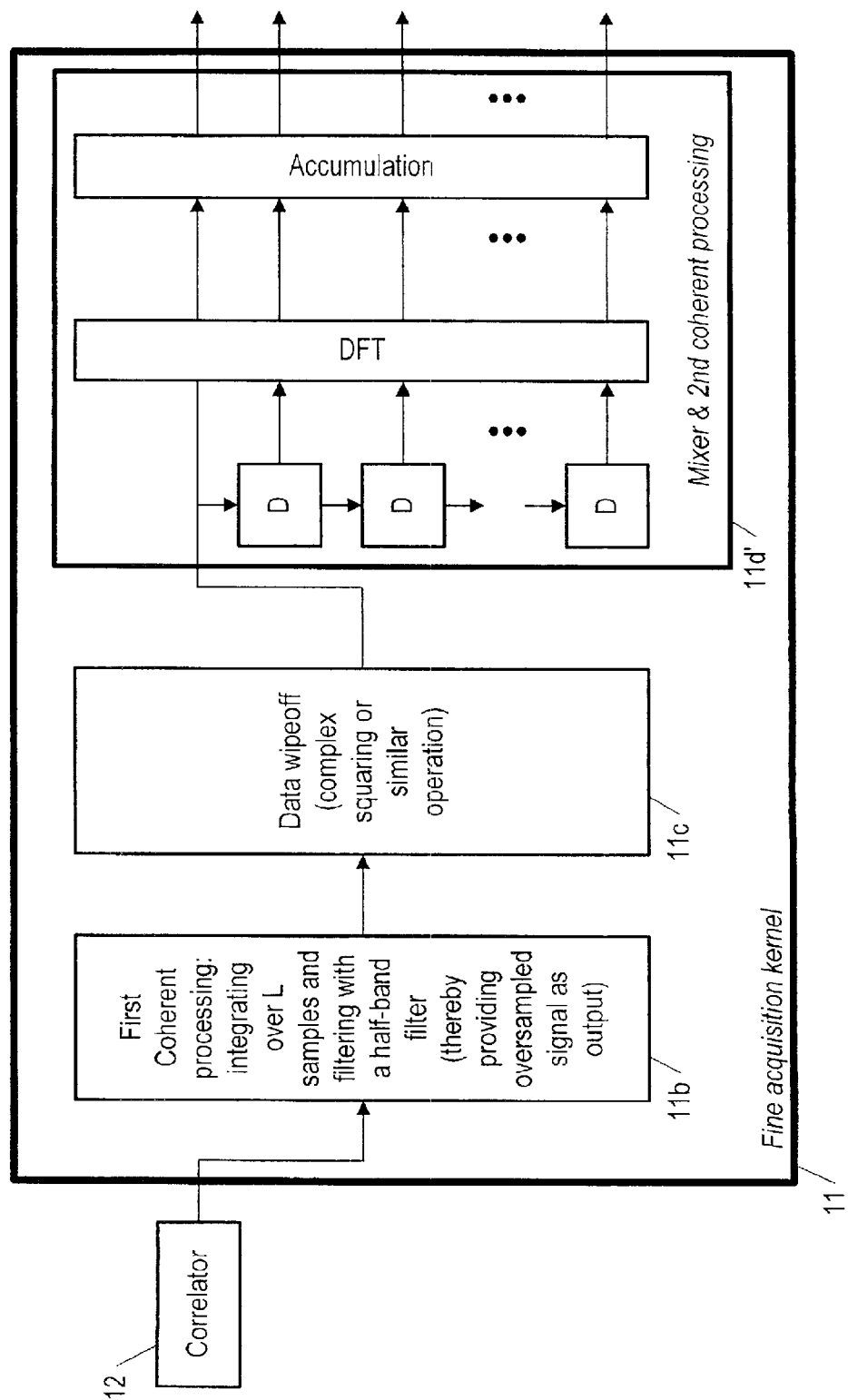
FIG. 3B is a schematic/block diagram of an implementation of the second embodiment, an implementation using a discrete Fourier transform in which the output of the correlator is not demodulated (based on a guess of the fine frequency shift correction) until after the first coherent processing.
Figure 3C:
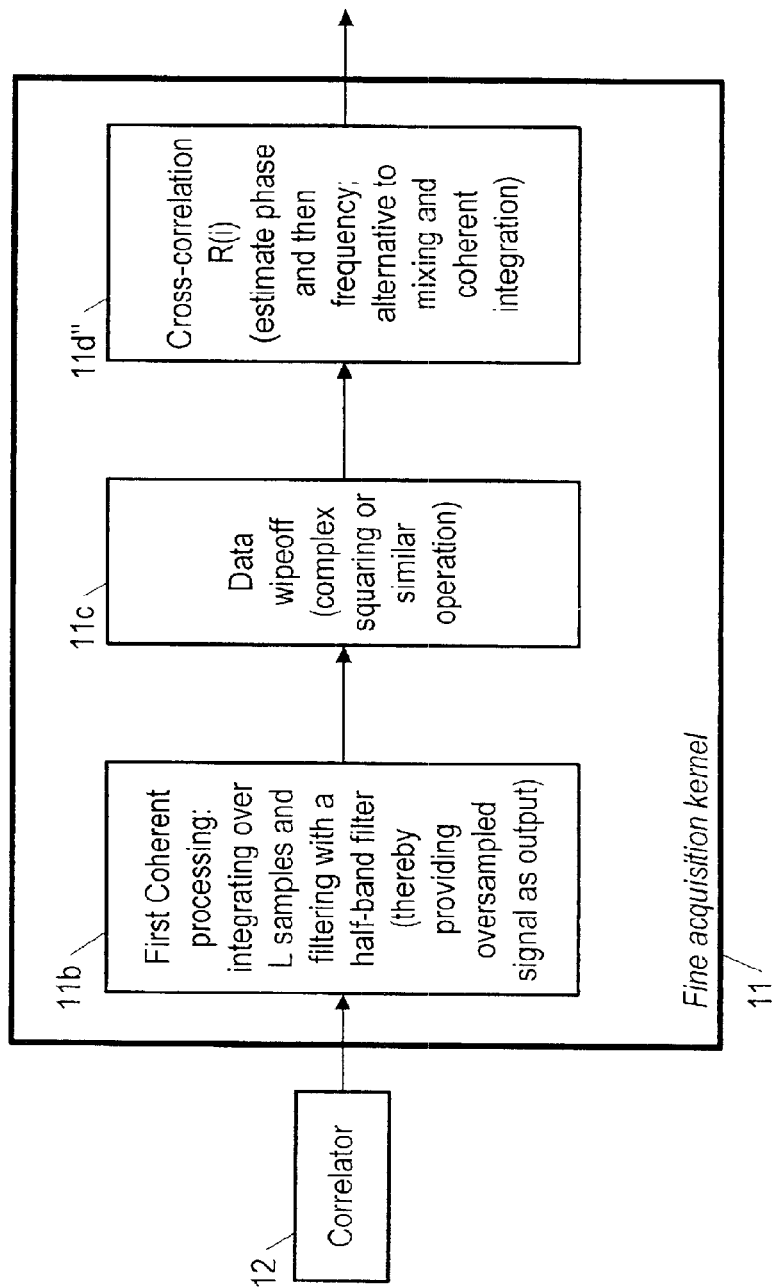
FIG. 3C is a schematic/block diagram of another implementation of the second embodiment, an implementation using a cross correlation, instead of a mixing and second coherent integration.

Referring now to FIGS. 3A–C, in other embodiments of a fine acquisition kernel according to the invention, instead of demodulating the output of the correlator, as is done in the embodiments illustrated in FIGS. 2A–D, the first coherent processing is performed directly on the output of the correlator, and the result is then complex squared (or a similar data wipeoff operation is performed) by the data wipeoff module and then analyzed for spectral content, invoking any of the methods of known in the art. Decoupling the coherent processing from the analyzed frequency range (up to 1 kHz) allows having several channels, each of the form illustrated in either FIG. 3A, 3B or 3C. The purpose of the first coherent stage is to reduce further the bandwidth by a factor of 2·L compared to the correlator output, and also to oversample the signal. This bandwidth reduction and oversampling can be accomplished by for example integrating over L samples and then filtering using a half-band filter, i.e. e.g. a filter with coefficients h=[1.0,1.0]. The basic idea in the approaches illustrated in FIGS. 3A–C is to apply the first coherent processing step for different fine frequency estimates, square the result (to perform data wipeoff), and then analyze the frequency content using one or another spectral analysis tool (such as correlation of the result with sinusoids). Using a single first coherent processing module for a group of frequencies reduces the complexity of the fine acquisition twofold because demodulations are applied at a reduced rate, i.e. the complexity is reduced not simply because of not providing parallel paths (one for each channel) until after the data wipeoff module, but also because demodulations are applied at a reduced rate, i.e. after the first coherent processing, which produces outputs at a rate that is down by a factor of the integration length compared to the input to the coherent processing. (For example, if the coherent processing involves an integration over 10 samples, then there is one output for every ten inputs.)

For example, referring to FIG. 3A, assume that it is decided to apply the fine acquisition process to the range [−100,100] Hz, and that the output of the correlator 12 includes frequencies in the range [−500,500] Hz (i.e. including both the navigation data modulation and the residual carrier frequency). If the first coherent processing module 11b integrates 20 consecutive samples, frequencies in the range [−25,25] Hz will be filtered out by the first coherent processing process (since there are 20 such 50 Hz intervals in the 1000 Hz interval). Each such filtering produces a 50 Hz bandwidth channel, and four such channels are included in the 200 Hz-wide range of [−100,100] Hz. Therefore, after the correlator 12, four fine acquisition kernels 11 as in FIG. 3A are used. The spectral estimation module 11d" is used to pick out the remnant carrier modulation amidst noise, providing a correction to the coarse estimate (provided by the correlator 12) with an uncertainty down to as little as 1 Hz.

The implementation illustrated in FIG. 3B, although fast, has as a drawback that when the integrate and dump unit is used for the first coherent processing, the frequency response is degraded for the frequencies close to the edges of the analyzed frequency interval because the first coherent processing module 11b is not an ideal filter. The degradation is enhanced by the data wipeoff module.

3rd Embodiment

Figure 4:
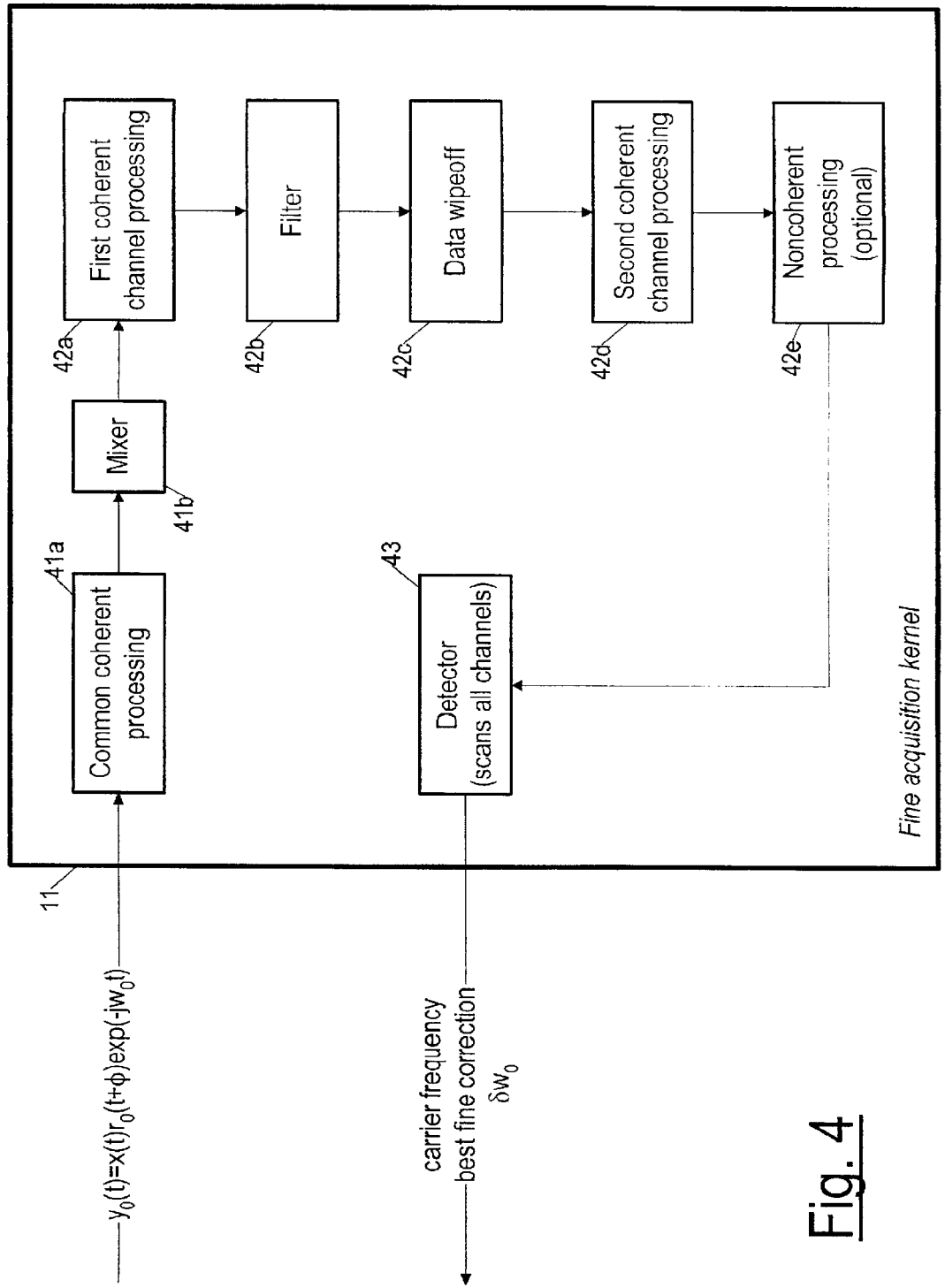
FIG. 4 is a 3rd embodiment of the present invention, one similar to the second embodiment as indicated in FIGS. 3A–C, with a common first coherent processing module, but one in which the bandwidth of the signal after correlation is reduced by filtering the signal.

Referring now to FIG. 4, in another, 3rd embodiment of the invention, one similar to the second embodiment as indicated in FIGS. 3A–C, a common first coherent processing module 41 is used to reduce the bandwidth of the signal after correlation. For example, if the frequency resolution of the initial acquisition is 100 Hz, then the bandwidth of the signal after correlation is reduced by filtering the signal to 100 Hz. Then the signal is demodulated as in the first embodiment (see FIG. 2A). Thus, in this third embodiment, the fine acquisition kernel 11 (FIG. 1) will have the following modules:

a common, coherent processing module 41a, i.e. processing the output of the correlator 12 (FIG. 1) before creating separate channels (for each trial fine frequency shift correction); and a filter 41b (in this case not included in the coherent processing module, as it is in the case of the coherent processing modules for the first and second embodiments);

then for each channel:
- a first channel coherent processing module 42a (e.g. an integrate & dump module);
- a filter 42b;
- a data wipeoff module 42c (e.g. for performing complex squaring, neighbor multiplication or other similar procedure);
- a second channel coherent processing module 42d (e.g. an integrate & dump module); and
- optionally, a noncoherent processing module 42e;

and finally, a detector 43 that scans the output of all individual channel computations.

In such an embodiment, the overall coherent length, i.e. the sum of the coherent integration length of the common coherent integration 41a (before splitting into separate channels) and the coherent integration length of the first coherent channel integration 42a, should not be too large, otherwise the degradation due to data modulation will be high.

The Value of Oversampling

The concept of coherent processing as lowpass filtering plus downsampling easily generalizes to filters of arbitrary length. After complex squaring (or similar operation) by the data wipeoff module, the bandwidth of the signal is expanded by a factor of two. Aliasing effects then occur for a critically sampled signal, but can be prevented by oversampling the signal before the data wipeoff module using complex squaring.

Oversampling compensates for the doubling of the bandwidth (resulting in aliasing) caused by complex squaring (or other, similar operation) of a critically sampled signal. Oversampling (by an appropriate factor) can provide a normalized bandwidth (i.e. a bandwidth divided by sampling frequency) that is approximately one half that for a critically sampled signal Thus, the Fourier transform of the complex square (or similar operation) of a critically sampled signal, because of the doubling of the bandwidth of the signal by the complex squaring, will show aliasing, but the oversampled spectrum of the complex squared signal will not.

Oversampling is of use not only in avoiding the aliasing effects that appear due to the bandwidth expansion after complex squaring (or other, similar data wipeoff operation), but also noise amplification effects due to noise aliasing caused by the complex squaring.

Comparison with Zero-padding Techniques

As described above, in zero-padding for spectral analysis, the data of a short signal segment are padded by adding a segment of zeroes before applying a DFT or a fast Fourier transform (FFT). The inventors have observed that although zero padding allows analyzing a signal at smaller frequency steps, and so can be considered as a tool to achieve the same ends as the invention, the maximum possible frequency resolution is, however, less than what can be achieved using the complex squaring of the invention even when combining zero-padding with noncoherent accumulation. The response of a system using zero-padding includes a main lobe having a width that is typically tens of times the width of the main lobe in the response of a system using the data wipeoff techniques of the invention. As mentioned above, the present invention reduces to zero-padding in an implementation that does not include a second coherent processing and complex squaring.

Using Different Starting Points

In the above description, the method for fine acquisition according to the invention is used directly at the output of the correlator 12 (FIG. 1B). In a GPS application, the correlator output provides samples of the signal at 1 ms intervals, and there are 20 such samples per data bit. It is assumed that the timing of the bit transitions (i.e. when they occur) is unknown, and the inventors have verified the method of the invention based on such an assumption. Thus, according to the preferred embodiment of the invention, the processing after the correlator starts somewhere in the middle of a data (navigation) bit (i.e. somewhere in the middle of a 20-sample interval) at one or another sample.

However, in another embodiment of the invention, the method starts from two or several different samples. In such an embodiment, the method first starts as in the preferred embodiment, at one or another sample, and proceeds as described above. But then the some predetermined number of samples (e.g. 10 samples) are skipped, and the method is restarted at a new starting point and again proceeds as described above. The procedure is performed for each of selected samples. In such an embodiment, therefore, the "phase" of the starting point with respect to the navigation data bit edge is changed. Such an embodiment might occasionally provide increased performance. In a straightforward implementation of such an embodiment, the processing for the two or several starting points is performed seriatim. In an alternative implementation, one designed to reduce acquisition time, the processing for the two starting points is performed in parallel.

Scope of the Invention

It is to be understood that the above-described arrangements are only illustrative of the application of the principles of the present invention. In particular, some of the computation required by an acquisition system according to the present invention can be performed outside of the device receiving the spread spectrum signal, such as by a component of a network using the spread spectrum signaling. Moreover, fine acquisition according to the invention can be used independently of an initial, coarse acquisition; it is useful in any situation where a signal includes a carrier component that must be estimated, but does not include a code component (i.e. in case of a code division multiple access signal, the code is wiped off the signal before the signal is processed according to the invention). In addition, other parallel and sequential architectures are comprehended besides what are expressly indicated herein, and numerous other modifications and alternative arrangements may be devised by those skilled in the art without departing from the spirit and scope of the present invention, and the appended claims are intended to cover such modifications and arrangements.

What is claimed is:

1. A method for acquiring a received spread spectrum signal, the received signal having a carrier component at a carrier frequency, a code component having a code period, and a data component, the acquiring including matching the phase of a replica of the code component to the phase of the received code component and also determining any shift in the carrier frequency away from a transmitted carrier frequency, the method comprising the steps of:

a) performing a first acquisition of the received signal so as to provide an approximately estimated carrier frequency and a phase of the replica of the code component and also so as to provide a code-wiped and an approximately carrier-wiped signal; and b) performing a second acquisition of the approximately carrier-swiped signal, the second acquisition including a substep of data wipe-off involving a squaring or a neighbor multiplication operation on a signal derived from the approximately carrier-wiped signal;

thereby providing a correction to the approximately estimated carrier frequency, a correction that accounts for the carrier frequency shift remaining after the first acquisition.

2. A method as claimed in claim 1, wherein the step of performing a second acquisition of the approximately carrier-wiped signal comprises the substeps of:
   a) mixing the approximately carrier-wiped signal with a plurality of sinusoids in turn, each sinusoid at a different frequency in a range of frequencies serving as trial corrections to the approximately estimated carrier frequency determined in the step of performing a first acquisition, so as to provide a mixed signal;
   b) performing a first coherent processing of the mixed signal so as to provide a carrier-amplified signal;
   c) performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency shift remaining after the first acquisition;
   d) performing a second coherent processing of the data-wiped signal, the second coherent processing for providing a correlated and filtered signal; and
   e) detecting a value to use for the correction to the approximately estimated carrier frequency based on the correlated and filtered signal for each different trial frequency correction.

3. A method as claimed in claim 2, wherein the first coherent processing comprises a lowpass filtering and a downsampling, and the second coherent processing comprises a coherent accumulation.

4. A method as claimed in claim 2, wherein the first coherent processing comprises an integrate and dump processing followed by a filtering, and the second coherent processing comprises a coherent accumulation.

5. A method as claimed in claim 2, wherein the first coherent processing comprises a discrete Fourier transform (DFT) processing using zero padding and output pruning, and the second coherent processing comprises a coherent accumulation.

6. A method as claimed in claim 1, wherein the step of performing a second acquisition of the approximately carrier-wiped signal comprises the substeps of:
   a) performing a first coherent processing of the approximately carrier-wiped signal so as to provide a carrier-amplified signal;
   b) performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency shift remaining after the first acquisition; and
   c) performing a mixing and second coherent processing, the mixing being performed on the data-wiped signal using a plurality of sinusoids in turn, each sinusoid at a different frequency in a range of frequencies serving as trial corrections to the approximately estimated carrier frequency determined in the step of performing a first acquisition, to provide a mixed and data-wiped signal, and the second coherent processing being performed on the mixed and data-wiped signal, the second coherent processing for providing a correlated and filtered signal.

7. A method as claimed in claim 6, wherein in the step of performing a mixing and second coherent processing, the coherent processing includes a discrete Fourier transform of the mixed and data-wiped signal followed by an accumulation.

8. A method as claimed in claim 1, wherein the step of performing a second acquisition of the approximately carrier-wiped signal comprises the substeps of:
   a) performing a first coherent processing of the approximately carrier-wiped signal so as to provide a carrier-amplified signal;
   b) performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency shift remaining after the first acquisition; and
   c) performing a cross correlation of the data-wiped signal, the cross correlation including estimating the phase and then the correction to the approximately estimated carrier frequency.

9. A method as claimed in claim 1, wherein the step of performing a second acquisition of the approximately carrier-wiped signal comprises the substeps of:
   a) performing a common coherent processing of the approximately carrier-wiped signal so as to provide a first-processed approximately carrier-wiped signal;
   b) mixing the first-processed approximately carrier-wiped signal with a plurality of sinusoids in turn, each sinusoid at a different frequency in a range of frequencies serving as trial corrections to the approximately estimated carrier frequency determined in the step of performing a first acquisition, so as to provide a mixed signal;
   c) performing a first coherent channel processing of the mixed signal so as to provide a carrier-amplified signal;
   d) performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency shift remaining after the first acquisition;
   e) performing a second coherent channel processing on the data-wiped signal, the second coherent processing for providing a correlated and filtered signal; and
   f) detecting a value to use for the correction to the approximately estimated carrier frequency based on the correlated and filtered signal for each different trial frequency correction.

10. A method as claimed in claim 1, wherein the first acquisition is a coarse acquisition, and the second acquisition is a fine acquisition.

11. A method as claimed in claim 1, wherein the squaring is a complex squaring.

12. An apparatus for acquiring a received spread spectrum signal, the received signal having a carrier component at a carrier frequency, a code component having a code period, and a data component, the acquiring including matching the phase of a replica of the code component to the phase of the received code component and also determining any shift in the carrier frequency away from a transmitted carrier frequency, the apparatus comprising:
   a) means for performing a first acquisition of the received signal so as to provide an approximately estimated carrier frequency and a phase of the replica of the code component and also so as to provide a code-wiped and an approximately carrier-wiped signal; and b) means for performing a second acquisition of the approximately carrier-wiped signal, the second acquisition including means for performing a data wipe-off involving a squaring or a neighbor multiplication operation on a signal derived from the approximately carrier-wiped signal;

thereby providing a correction to the approximately estimated carrier frequency, a correction that accounts for the carrier frequency shift remaining after the first acquisition.

13. An apparatus as claimed in claim 12, wherein the means for performing a second acquisition of the approximately carrier-wiped signal comprises:

a) means for mixing the approximately carrier-wiped signal with a plurality of sinusoids in turn, each sinusoid at a different frequency in a range of frequencies serving as trial corrections to the approximately estimated carrier frequency determined using the means for performing a first acquisition, so as to provide a mixed signal;

b) means for performing a first coherent processing of the mixed signal so as to provide a carrier-amplified signal;

c) means for performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency shift remaining after the first acquisition;

d) means for performing a second coherent processing of the data-wiped signal, the second coherent processing for providing a correlated and filtered signal; and e) means for detecting a value to use for the correction to the approximately estimated carrier frequency based on the correlated and filtered signal for each different trial frequency correction.

14. An apparatus as claimed in claim 13, wherein the means for performing a first coherent processing comprises a lowpass filter and a downsampler, and the means for performing a second coherent processing comprises a coherent accumulator.

15. An apparatus as claimed in claim 13, wherein the means for performing a first coherent processing comprises an integrate and dump module followed by a filter, and the means for performing a second coherent processing comprises a coherent accumulator.

16. An apparatus as claimed in claim 13, wherein the means for performing a first coherent processing comprises a discrete Fourier transform (DFT) module using zero padding and output pruning, and the means for performing a second coherent processing comprises a coherent accumulator.

17. An apparatus as claimed in claim 12, wherein the means for performing a second acquisition of the approximately carrier-wiped signal comprises:

a) means for performing a first coherent processing of the approximately carrier-wiped signal so as to provide a carrier-amplified signal;

b) means for performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency shift remaining after the first acquisition; and c) means for performing a mixing and second coherent processing, the mixing being performed on the data-wiped signal using a plurality of sinusoids in turn, each sinusoid at a different frequency in a range of frequencies serving as trial corrections to the approximately estimated carrier frequency determined by the means for performing a first acquisition, to provide a mixed and data-wiped signal, and the second coherent processing being performed on the mixed and data-wiped signal, the second coherent processing for providing a correlated and filtered signal.

18. An apparatus as claimed in claim 17, wherein the means for performing a mixing and second coherent processing includes a means for performing a discrete Fourier transform of the mixed and data-wiped signal followed by an accumulator.

19. An apparatus as claimed in claim 12, wherein the means for performing a second acquisition of the approximately carrier-wiped signal comprises:

a) means for performing a first coherent processing of the approximately carrier-wiped signal so as to provide a carrier-amplified signal;

b) means for performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency shift remaining after the first acquisition; and c) means for performing a cross correlation of the data-wiped signal, the cross correlation including estimating the phase and then the correction to the approximately estimated carrier frequency.

20. An apparatus as claimed in claim 12, wherein the means for performing a second acquisition of the approximately carrier-wiped signal comprises:

a) means for performing a common coherent processing of the approximately carrier-wiped signal so as to provide a first-processed approximately carrier-wiped signal;

b) means for mixing the first-processed approximately carrier-wiped signal with a plurality of sinusoids in turn, each sinusoid at a different frequency in a range of frequencies serving as trial corrections to the approximately estimated carrier frequency determined using the means for performing a first acquisition, so as to provide a mixed signal;

c) means for performing a first coherent channel processing of the mixed signal so as to provide a carrier-amplified signal;

d) means for performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency shift remaining after the first acquisition;

e) means for performing a second coherent channel processing on the data-wiped signal, the second coherent processing for providing a correlated and filtered signal; and f) means for detecting a value to use for the correction to the approximately estimated carrier frequency based on the correlated and filtered signal for each different trial frequency correction.

21. An apparatus as claimed in claim 12, wherein the first acquisition is a coarse acquisition, and the second acquisition is a fine acquisition.

22. An apparatus as claimed in claim 12, wherein the squaring is a complex squaring.

23. A system for acquiring a spread spectrum signal, the signal having a carrier component at a carrier frequency, a code component having a code period, and a data component, the acquiring including matching the phase of a replica of the code component to the phase of the code component and also determining any shift in the carrier frequency away from a transmitted carrier frequency, the system comprising:
   a) a receiver, for receiving the spread spectrum signal as a sequence of samples, for providing a received signal;
   b) means for performing a first acquisition of the received signal so as to provide an approximately estimated carrier frequency and a phase of the replica of the code component and also so as to provide a code-wiped and an approximately carrier-wiped signal; and
   c) means for performing a second acquisition of the approximately carrier-wiped signal, the second acquisition including means for performing a data wipe-off involving a squaring or a neighbor multiplication operation on a signal derived from the approximately carrier-wiped signal;
   thereby providing a correction to the approximately estimated carrier frequency, a correction that accounts for the carrier frequency shift remaining after the first acquisition.

24. A system as claimed in claim 23, wherein the means for performing a second acquisition of the approximately carrier-wiped signal comprises:
   a) means for mixing the approximately carrier-wiped signal with a plurality of sinusoids in turn, each sinusoid at a different frequency in a range of frequencies serving as trial corrections to the approximately estimated carrier frequency determined using the means for performing a first acquisition, so as to provide a mixed signal;
   b) means for performing a first coherent processing of the mixed signal so as to provide a carrier-amplified signal;
   c) means for performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency shift remaining after the first acquisition;
   d) means for performing a second coherent processing of the data-wiped signal, the second coherent processing for providing a correlated and filtered signal; and
   e) means for detecting a value to use for the correction to the approximately estimated carrier frequency based on the correlated and filtered signal for each different trial frequency correction.

25. A system as claimed in claim 24, wherein the means for performing a first coherent processing comprises a lowpass filter and a downsampler, and the means for performing a second coherent processing comprises a coherent accumulator.

26. A system as claimed in claim 24, wherein the means for performing a first coherent processing comprises an integrate and dump module followed by a filter, and the means for performing a second coherent processing comprises a coherent accumulator.

27. A system as claimed in claim 24, wherein the means for performing a first coherent processing comprises a discrete Fourier transform (DET) module using zero padding and output pruning, and the means for performing a second coherent processing comprises a coherent accumulator.

28. A system as claimed in claim 23, wherein the means for performing a second acquisition of the approximately carrier-wiped signal comprises:
   a) means for performing a first coherent processing of the approximately carrier-wiped signal so as to provide a carrier-amplified signal;
   b) means for performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency shift remaining after the first acquisition; and
   c) means for performing a mixing and second coherent processing, the mixing being performed on the data-wiped signal using a plurality of sinusoids in turn, each sinusoid at a different frequency in a range of frequencies serving as trial corrections to the approximately estimated carrier frequency determined by the means for performing a first acquisition, to provide a mixed and data-wiped signal, and the second coherent processing being performed on the mixed and data-wiped signal, the second coherent processing for providing a correlated and filtered signal.

29. A system as claimed in claim 28, wherein the means for performing a mixing and second coherent processing includes a means for performing a discrete Fourier transform of the mixed and data-wiped signal followed by an accumulator.

30. A system as claimed in claim 23, wherein the means for performing a second acquisition of the approximately carrier-wiped signal comprises:
   a) means for performing a first coherent processing of the approximately carrier-wiped signal so as to provide a carrier-amplified signal;
   b) means for performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency shift remaining after the first acquisition; and
   c) means for performing a cross correlation of the data-wiped signal, the cross correlation including estimating the phase and then the correction to the approximately estimated carrier frequency.

31. A system as claimed in claim 23, wherein the means for performing a second acquisition of the approximately carrier-wiped signal comprises:
   a) means for performing a common coherent processing of the approximately carrier-wiped signal so as to provide a first-processed approximately carrier-wiped signal;
   b) means for mixing the first-processed approximately carrier-wiped signal with a plurality of sinusoids in turn, each sinusoid at a different frequency in a range of frequencies serving as trial corrections to the approximately estimated carrier frequency determined using the means for performing a first acquisition, so as to provide a mixed signal;
   c) means for performing a first coherent channel processing of the mixed signal so as to provide a carrier-amplified signal;

d) means for performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency shift remaining after the first acquisition;

e) means for performing a second coherent channel processing on the data-wiped signal, the second coherent processing for providing a correlated and filtered signal; and f) means for detecting a value to use for the correction to the approximately estimated carrier frequency based on the correlated and filtered signal for each different trial frequency correction.

32. A system as claimed in claim 23, wherein the first acquisition is a coarse acquisition, and the second acquisition is a fine acquisition.

33. A system as claimed in claim 23, wherein the squaring is a complex squaring.

34. The system as claimed in claim 23, wherein at least some of the means for performing either all or part of the first acquisition or all or part of the second acquisition are performed by computing facilities external to the receiver, such as by computing facilities that are part of an outside network.

35. A method for acquiring a signal having a carrier component at a carrier frequency and a data component, the acquiring including determining the carrier frequency, the method comprising the steps of:

a) providing the signal including the carrier component and the data component;

b) providing an estimate of the carrier frequency using a process including a substep of data wipe-off involving a squaring or a neighbor multiplication operation on the provided signal and providing a data-wiped signal, the sub-step of data wipe-off in turn followed by a sub-step of coherent processing of the data-wiped signal, the coherent processing including a process in which either consecutive signal samples are summed or consecutive signal samples are summed after being multiplied by respective factors;

thereby acquiring the signal to a finer resolution than would be possible without performing a data wipe-off of the data component.

36. A method as claimed in claim 35, wherein the step of providing an estimate of the carrier frequency comprises the substeps of:

a) mixing the signal with a plurality of sinusoids in turn, each sinusoid at a different frequency in a range of frequencies serving as trial estimates of the carrier frequency, so as to provide a mixed signal;

b) performing a first coherent processing of the mixed signal so as to provide a carrier-amplified signal;

c) performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency;

d) performing a second coherent processing of the data-wiped signal, the second coherent processing for providing a correlated and filtered signal; and e) detecting a value to use for the estimate of the carrier frequency based on the correlated and filtered signal for each different trial frequency estimate.

37. A method as claimed in claim 35, wherein the step of providing an estimate of the carrier frequency includes providing an approximately carrier-wiped signal and comprises the substeps of:

a) performing a first coherent processing of the approximately carrier-wiped signal so as to provide a carrier-amplified signal;

b) performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency; and c) performing a mixing and second coherent processing, the mixing being performed on the data-wiped signal using a plurality of sinusoids in turn, each sinusoid at a different frequency in a range of frequencies serving as trial estimates of the carrier frequency, to provide a mixed and data-wiped signal, and the second coherent processing being performed on the mixed and data-wiped signal, the second coherent processing for providing a correlated and filtered signal.

38. A method as claimed in claim 37, wherein in the step of performing a mixing and second coherent processing, the coherent processing includes a discrete Fourier transform of the mixed and data-wiped signal followed by an accumulation.

39. A method as claimed in claim 35, wherein the step of providing an estimate of the carrier frequency includes providing an approximately carrier-wiped signal and comprises the substeps of:

a) performing a first coherent processing of the approximately carrier-wiped signal so as to provide a carrier-amplified signal;

b) performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency of the signal; and c) performing a cross correlation of the data-wiped signal, the cross correlation including estimating the phase and then the carrier frequency of the signal.

40. A method as claimed in claim 35, wherein the step of providing an estimate of the carrier frequency comprises the substeps of:

a) performing a common coherent processing of the signal so as to provide a first-processed signal;

b) mixing the first-processed signal with a plurality of sinusoids in turn, each sinusoid at a different frequency in a range of frequencies serving as trial estimates of the carrier frequency, so as to provide a mixed signal;

c) performing a first coherent channel processing of the mixed signal so as to provide a carrier-amplified signal;

d) performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency of the signal;

e) performing a second coherent channel processing on the data-wiped signal, the second coherent processing for providing a correlated and filtered signal; and f) detecting a value to use for the estimate of the carrier frequency based on the correlated and filtered signal for each different trial frequency.

41. An apparatus for acquiring a signal having a carrier component at a carrier frequency and a data component, the acquiring including determining the carrier frequency, the apparatus comprising:
   a) means for providing the signal including the carrier component and the data component;
   b) means for providing an estimate of the carrier frequency including means for performing a data wipe-off involving a squaring or a neighbor multiplication operation on the provided signal and providing a data-wiped signal, and also including means for coherent processing of the data-wiped signal, the coherent processing including a process in which either consecutive signal samples are summed or consecutive signal samples are summed after being multiplied by respective factors;
      thereby acquiring the signal to a finer resolution than would be possible without performing a data wipe-off of the data component.

42. An apparatus as claimed in claim 41, wherein the means for providing an estimate of the carrier frequency comprises:
   a) means for mixing the signal with a plurality of sinusoids in turn, each sinusoid at a different frequency in a range of frequencies serving as trial estimates of the carrier frequency, so as to provide a mixed signal;
   b) means for performing a first coherent processing of the mixed signal so as to provide a carrier-amplified signal;
   c) means for performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency;
   d) means for performing a second coherent processing of the data-wiped signal, the second coherent processing for providing a correlated and filtered signal; and
   e) means for detecting a value to use for the estimate of the carrier frequency based on the correlated and filtered signal for each different trial frequency estimate.

43. An apparatus as claimed in claim 41, wherein the means for providing an estimate of the carrier frequency includes providing an approximately carrier-wiped signal and comprises:
   a) means for performing a first coherent processing of the approximately carrier-wiped signal so as to provide a carrier-amplified signal;
   b) means for performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency; and
   c) means for performing a mixing and second coherent processing, the mixing being performed on the data-wiped signal using a plurality of sinusoids in turn, each sinusoid at a different frequency in a range of frequencies serving as trial estimates of the carrier frequency, to provide a mixed and data-wiped signal, and the second coherent processing being performed on the mixed and data-wiped signal, the second coherent processing for providing a correlated and filtered signal.

44. An apparatus as claimed in claim 43, wherein the means for performing a mixing and second coherent processing includes means for performing a discrete Fourier transform of the mixed and data-wiped signal followed by an accumulation.

45. An apparatus as claimed in claim 41, wherein the means for providing an estimate of the carrier frequency includes providing an approximately carrier-wiped signal and comprises:
   a) means for performing a first coherent processing of the approximately carrier-wiped signal so as to provide a carrier-amplified signal;
   b) means for performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency of the signal; and
   c) means for performing a cross correlation of the data-wiped signal, the cross correlation including estimating the phase and then the carrier frequency of the signal.

46. An apparatus as claimed in claim 41, wherein the means for providing an estimate of the carrier frequency comprises:
   a) means for performing a common coherent processing of the signal so as to provide a first-processed signal;
   b) means for mixing the first-processed signal with a plurality of sinusoids in turn, each sinusoid at a different frequency in a range of frequencies serving as trial estimates of the carrier frequency, so as to provide a mixed signal;
   c) means for performing a first: coherent channel processing of the mixed signal so as to provide a carrier-amplified signal;
   d) means for performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency of the signal;
   e) means for performing a second coherent channel processing on the data-wiped signal, the second coherent processing for providing a correlated and filtered signal: and
   f) means for detecting a value to use for the estimate of the carrier frequency based on the correlated and filtered signal for each different trial frequency.

47. A system for acquiring a signal having a carrier component at a carrier frequency and a data component, the acquiring including determining the carrier frequency, the system comprising:
   a) a receiver, for receiving the signal as a sequence of samples;
   b) means for providing an estimate of the carrier frequency including means for performing a data wipe-off involving a squaring or a neighbor multiplication operation on the received signal and providing a data-wiped signal, arid also including means for coherent processing of the data-wiped signal, the coherent processing including a process in which either consecutive signal samples are summed or consecutive signal samples are summed after being multiplied by respective factors;
      thereby acquiring the signal to a finer resolution than would be possible without performing a data wipe-off of the data component.

48. A system as claimed in claim 47, wherein the means for providing an estimate of the carrier frequency comprises:

a) means for mixing the signal with a plurality of sinusoids in turn, each sinusoid at a different frequency in a range of frequencies serving as trial estimates of the carrier frequency, so as to provide a mixed signal;

b) means for performing a first coherent processing of the mixed signal so as to provide a carrier-amplified signal;

c) means for performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency;

d) means for performing a second coherent processing of the data-wiped signal, the second coherent processing for providing a correlated and filtered signal; and e) means for detecting a value to use for the estimate of the carrier frequency based on the correlated and filtered signal for each different trial frequency estimate.

49. A system as claimed in claim 47, wherein the means for providing an estimate of the carrier frequency includes providing an approximately carrier-wiped signal and comprises:

a) means for performing a first coherent processing of the approximately carrier-wiped signal so as to provide a carrier-amplified signal;

b) means for performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency; and c) means for performing a mixing and second coherent processing, the mixing being performed on the data-wiped signal using a plurality of sinusoids in turn, each sinusoid at a different frequency in a range of frequencies serving as trial estimates of the carrier frequency, to provide a mixed and data-wiped signal, and the second coherent processing being performed on the mixed and data-wiped signal, the second coherent processing for providing a correlated and filtered signal.

50. A system as claimed in claim 49, wherein the means for performing a mixing and second coherent processing includes means for performing a discrete Fourier transform of the mixed and data-wiped signal followed by an accumulation.

51. A system as claimed in claim 47, wherein the means for providing an estimate of the carrier frequency includes providing an approximately carrier-wiped signal and comprises:

a) means for performing a first coherent processing of the approximately carrier-wiped signal so as to provide a carrier-amplified signal;

b) means for performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency of the signal; and c) means for performing a cross correlation of the data-wiped signal, the cross correlation including estimating the phase and then the carrier frequency of the signal.

52. A system as claimed in claim 47, wherein the means for providing an estimate of the carrier frequency comprises:

a) means for performing a common coherent processing of the signal so as to provide a first-processed signal;

b) means for mixing the first-processed signal with a plurality of sinusoids in turn, each sinusoid at a different frequency in a range of frequencies serving as trial estimates of the carrier frequency, so as to provide a mixed signal;

c) means for performing a first coherent channel processing of the mixed signal so as to provide a carrier-amplified signal;

d) means for performing a data wipeoff using the carrier-amplified signal so as to provide a data-wiped signal, the data wipeoff including a squaring or a neighbor multiplication operation on the carrier-amplified signal, thus retaining in the data-wiped signal, information about the carrier frequency of the signal;

e) means for performing a second coherent channel processing on the data-wiped signal, the second coherent processing for providing a correlated and filtered signal; and f) means for detecting a value to use for the estimate of the carrier frequency based on the correlated and filtered signal for each different trial frequency.

* * * * *

UNITED STATES PATENT AND TRADEMARK OFFICE
CERTIFICATE OF CORRECTION

PATENT NO. : 6,909,736 B2
DATED : December 14, 2000
INVENTOR(S) : David Akopian et al.

It is certified that error appears in the above-identified patent and that said Letters Patent is hereby corrected as shown below:

Column 14,
Line 62, delete "carrier-swiped" and replace with -- carrier-wiped --.

Column 19,
Line 67, delete "(DET)" and replace with -- (DFT) --.

Column 24,
Line 31, after "first", delete ":".
Line 43, delete ":" and replace with -- ; --.
Line 57, delete "arid" and replace with -- and --.

Signed and Sealed this

Sixth Day of September, 2005

JON W. DUDAS
*Director of the United States Patent and Trademark Office*